No. 890,892. PATENTED JUNE 16, 1908.
L. F. DOUGLASS.
FISHING REEL.
APPLICATION FILED FEB. 23, 1907.
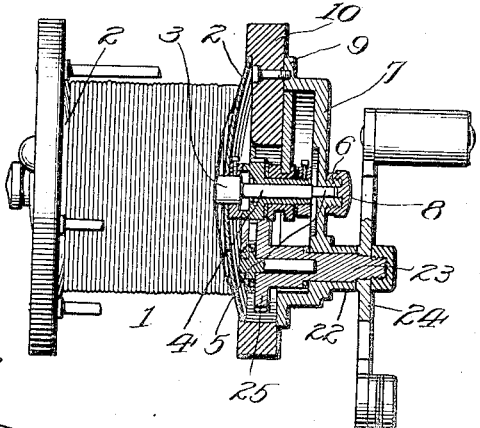
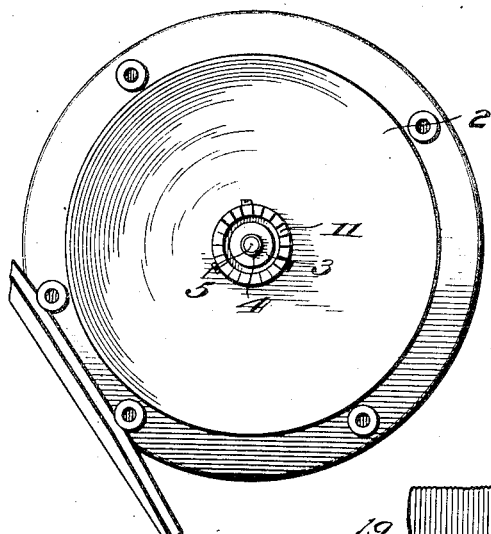
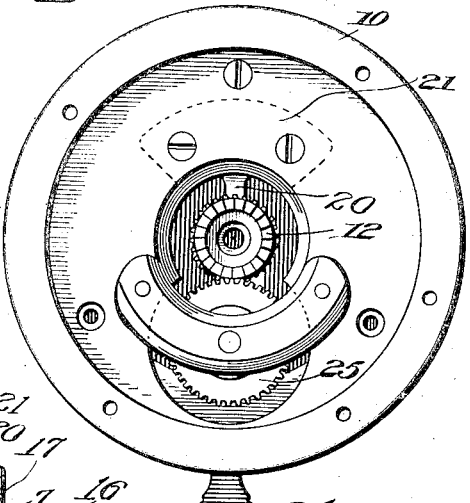
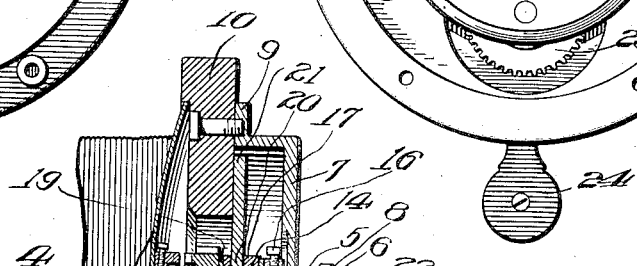
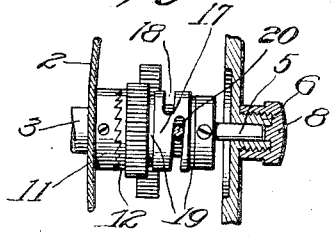
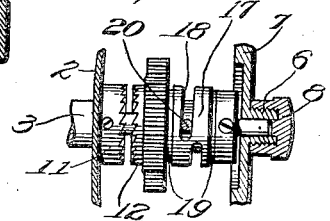
WITNESSES:
F. C. Barry
Walter A. Holden
INVENTOR
Leon F. Douglass
BY
ATTORNEY.

UNITED STATES PATENT OFFICE.

LEON F. DOUGLASS, OF SAN RAFAEL, CALIFORNIA.

FISHING-REEL.

No. 890,892.      Specification of Letters Patent.      Patented June 16, 1908.

Application filed February 23, 1907. Serial No. 358,783.

*To all whom it may concern:*

Be it known that I, LEON F. DOUGLASS, a citizen of the United States, residing at San Rafael, in the county of Marin, State of California, have invented certain new and useful Improvements in Fishing-Reels, of which the following is a full, clear, and complete disclosure.

My invention relates to fishing reels, and more particularly to the winding mechanism thereof.

The object of my invention is to provide a fishing reel in which the spool and the winding crank can be connected by the rotation of the crank in one direction and can be disconnected, to permit the spool to run free by the rotation of the crank in the reverse direction.

For a full, clear and complete disclosure of my invention, reference may be had to the following description and accompanying drawings in which like reference characters refer to corresponding parts.

In the drawings Figure 1, is an elevation of a fishing reel showing a part thereof broken away, and in longitudinal section to show the winding mechanism; Fig. 2, an end view of the spool removed from the winding mechanism. Fig. 3, an end view of the winding mechanism, the part of the spool in Fig. 2 being removed. Fig. 4 a longitudinal section of the winding mechanism showing a fragmentary portion of the spool. Fig. 5, a detail view of a part of the mechanism in its engaged position, and Fig. 6, a view of the same mechanism in a disengaged position.

The reel consists of a spool 1 constructed in the usual manner having end flanges 2, 2. Rigid with the spool 1 is a shaft 3 which projects outwardly from one end thereof, the said shaft being stepped to form reduced portions 4 and 5. Over and forming a bearing for the reduced portion 5 of the shaft is located an external screw threaded apertured sleeve 6 which sleeve forms an outward projection of the outer surface of the cover 7. Over said sleeve is screwed the cap or closure 8. Secured to the periphery 9 of the cover 7 is a plate 10 having an opening therein which passes over the reduced portions 4 and 5 of the shaft 3. On the inner side of said plate is a circular depression in which revolves one of the flanges 2 of the spool 1. The outer reduced portion 5 of the shaft 3 is mounted in the casing 7 and the plate 10, but does not communicate its revolutions thereto.

Secured to the shaft 3 close to the flange 2 is a crown ratchet gear 11 and loosely mounted upon the reduced portion 4 of the shaft is an oppositely disposed crown ratchet gear 12 having gear teeth around its peripheral portion and having its outer portion reduced, forming a shoulder 13 and sleeve 14, the extremity of the latter being screw threaded. Upon the screw threaded extremity of the sleeve 14 is locked the nut 15 by means of the screw 16. Loosely mounted upon the sleeve 14, between the shoulder 13 and the nut 15, is a revolving cam 17 having a spiral groove 18 in the face thereof, and to each side thereof respectively are secured the washers 19, 19 made of leather or like frictional material. A lug 20 depending from the plate 21 secured to the plate 10 projects into the spiral cam groove 18 of the cam 17. Projecting outwardly over the exterior surface of the casing 7 is a sleeve 22 in which is journaled a crank shaft 23, having a crank handle 24 on the outer extremity thereof and a gear 25 on the inner extremity, the said gear meshing with the gear teeth on the periphery of the crown ratchet member 12.

Having now described my invention, I will proceed to explain the operation thereof. When the line runs out unwinding the spool, the shaft 3, with its reduced portion 4 revolves and carries with it the engaging member 11 rigidly connected to said shaft 3. The engagement of the engaging member 11 with the opposite disposed engaging member 12, causes the latter together with its sleeve 14 to rotate with the reduced portion 4 of the said shaft 3. The revolution of the said member 12 and its sleeve 14 causes the cam 17 also to turn by reason of the frictional engagement between the said member 12 and the said cam 17 with the washers 19, but the revolution of said cam 17 causes a longitudinal movement of the same in a direction away from the member 11, outwardly on account of the engagement of the projecting member 20 with the spiral groove of said cam and in its longitudinal movement the cam carries with it the engaging member 12 and withdraws it from the other engaging member 11. Thus the engaging member 12 being withdrawn from the coöperating member 11, the member 12 ceases to rotate and the spool, the engaging member 11 and the shaft 3 all revolve freely together. To wind in the line the crank 24 is revolved in the opposite direction from that in which the spool should revolve, thus turning the crank shaft 23, gear 25, which meshes with the peripheral teeth of the engaging member 12, thus rotating the same together with all the parts rigid therewith and the cam 17 which in its first revolution moves longitudinally, moving the engaging member 12 into engagement with the engaging member 11, thus communicating its revolutions to the shaft 3 and spool 1. When the two engaging members 11 and 12 respectively become connected, the friction between the cam 17 and the engaging member is overcome, and the cam is held from further revolution by the engagement of the projection 20 with one of the ends of the spiral grooves 18. The adjustment of the cam on the sleeve 14 may be effected by the screwing and unscrewing of the nut 15 and a more or less amplitude may be given to the longitudinal movement effected by the cam according to the pitch of the spiral groove in the peripheral face thereof.

I have illustrated and described the engaging members as crown ratchets, but any other equivalent engaging or clutch mechanism may be utilized as desired. Although the train of mechanism for transmitting motion between the crank and the spool is such as to cause them when connected to revolve in opposite directions, yet it is obvious that the train may be so arranged as to cause them to revolve in the same direction if desired.

Having now described my invention what I desire to protect and to obtain by Letters-Patent of the United States, is:—

1. In a fishing reel the combination with a spool and crank shaft, of means for connecting and disconnecting the crank shaft and the spool comprising a shaft and a clutch member, said shaft and said clutch member being fixed with respect to said spool, a longitudinally movable engaging member revolubly mounted on said shaft, and a revolving cam mounted on said engaging member, but in slight frictional contact therewith, means rigid relatively to said shaft to cause said cam to move said engaging member longitudinally to engage and disengage said clutch member when said cam is revolved, and means for transmitting rotary motion from said crank shaft to said engaging member.

2. In a fishing reel the combination with a plate having an opening therein, a rotatable spool and a clutch member on one side thereof, winding mechanism and a casing for the winding mechanism secured over said opening upon the other side thereof, of a crank shaft passing through said casing, and means for connecting and disconnecting said crank shaft with said spool, comprising a longitudinally movable and revolubly engaging member and means actuated by the rotation of the crank shaft to cause the said engaging member to engage said clutch member and rotate the spool.

3. In a fishing reel the combination with a spool and a winding element, of means for connecting and disconnecting the spool and the winding element, comprising a shaft and a clutch member rotatable with said spool, a longitudinally movable engaging member revoluble thereon, a revolving cam mounted on said engaging member and in slight frictional contact therewith, means rigid relatively to said shaft to cause said cam to move said engaging member longitudinally to engage and disengage said clutch member when said cam is revolved, and means for transmitting rotary motion from said winding element to said engaging member.

4. In a fishing reel the combination with a spool and a winding element, of a shaft revoluble with said spool, a longitudinally movable engaging member revolubly mounted on said shaft, a revoluble cam mounted on said engaging member, but in slight frictional contact therewith, and a fixed member engaging said cam whereby the positive rotation of the winding element will cause the latter to be connected with the spool and the unwinding of the spool will cause the latter element to be disconnected from the winding element.

5. In a fishing reel the combination with a winding element and a spool, of a shaft and a clutch member revoluble with said spool, a longitudinally movable engaging member revolubly mounted on said shaft, a revolving cam having a spiral groove in the periphery thereof revolubly mounted on said engaging member, but in slight frictional contact therewith, means for transmitting rotary motion from the winding element to said engaging member, a rigid member projecting into the spiral groove of said cam to move the latter together with said engaging member longitudinally to connect said spool and winding element when the latter is rotated in a positive direction, and to disconnect said spool and winding element when the spool is rotated in a reverse direction.

6. In a fishing reel, the combination with a rotary member of means for rotating said member, said means comprising a revoluble shaft, an engaging member rotatably and longitudinally movable with respect to said shaft, means to rotate said engaging member, a concentric member carried by said engaging member fixed longitudinally but rotatable with respect thereto and in slight frictional contact therewith and a fixed member coacting therewith for causing the rotation of said engaging member to move the same longitudinally.

7. In a fishing reel, the combination with a rotary member of means for rotating said member, said means comprising a revoluble shaft, an engaging member rotatably and longitudinally movable with respect to said shaft, means to rotate said engaging member, a concentric member carried by said engaging member fixed longitudinally but rotatable with respect thereto and in slight frictional contact therewith and a fixed member co-acting therewith for causing the rotation of said engaging member in one direction to move the same longitudinally into engagement with said first mentioned rotary member and for causing the rotation of said engaging member in the opposite direction to disengage said member.

8. In a fishing reel, the combination with a rotary member of a rotatable engaging member, means to rotate said engaging member, a concentric member carried by said engaging member and revoluble with respect thereto, a relatively fixed member engaging said concentric member and adjustable means to cause friction between said engaging member and said concentric member, whereby the rotation of said engaging member in opposite directions causes the same to engage and disengage respectively the said rotary member.

9. In a fishing reel, the combination with a rotary member of a rotatable engaging member, means to rotate said engaging member, a concentric cam having a spiral groove carried by said engaging member and revoluble with respect thereto, a relatively fixed member engaging in the spiral groove of said concentric cam, and adjustable means to cause friction between said engaging member and said cam, whereby the rotation of said engaging member in opposite directions causes the same to engage and disengage respectively said rotary member.

10. In a fishing reel the combination with a rotary member of a rotatable engaging member having a reduced end, a concentric member mounted upon said reduced end, and revoluble with respect thereto, a nut threaded upon said reduced end to vary the friction between said concentric member and said engaging member, and a fixed member engaging said concentric member whereby the rotation of said engaging member in opposite directions causes the same to engage and disengage respectively said rotary member.

11. In a fishing reel, the combination with a rotatable shaft of a spool fixed thereon, a clutch member rigid with said spool, an engaging member mounted on said shaft and rotatable and longitudinally movable with respect thereto, means to rotate said engaging member, and means to move said engaging member into engagement with said clutch member to rotate said spool.

12. In a fishing reel, the combination with a rotatable shaft of a spool fixed thereon, a clutch member rigid with said spool, an engaging member mounted on said shaft and rotatable and longitudinally movable with respect thereto, means to rotate said engaging member and means actuated by said rotating means to move said engaging member into engagement with said clutch member to rotate said spool.

13. In a fishing reel, the combination with a rotatable shaft of a spool fixed thereon, a clutch member fixed on said spool, an engaging member, means to rotate said engaging member and means actuated by said rotating means to move said engaging member into engagement with said clutch member to rotate said spool in one direction.

14. In a fishing reel, the combination with a rotatable shaft of a spool fixed thereon, a clutch member fixed on said spool, an engaging member, means to rotate said engaging member and means actuated by said rotating means to move said engaging member into engagement with said clutch member to rotate said spool in one direction and actuated by the rotation of the spool in the opposite direction to disengage said engaging member.

15. In a fishing reel, the combination with a spool of a clutch member, an engaging member rotatable with respect to said spool and provided with gear teeth, a pinion engaging said gear teeth to rotate said engaging member and means actuated by the rotation of said pinion to move said engaging member into engagement with said clutch member to rotate said spool in one direction.

16. In a fishing reel, the combination with a spool of a clutch member, an engaging member rotatable with respect to said spool and provided with gear teeth, a pinion engaging said gear teeth to rotate said engaging member and means actuated by the rotation of said pinion to move said engaging member into engagement with said clutch member to rotate said spool in one direction and actuated by the rotation of said spool in the opposite direction to disengage said engaging member.

In witness whereof, I have hereunto set my hand this 11 day of February A. D. 1907.

LEON F. DOUGLASS.

Witnesses:
 Mrs. LEON F. DOUGLASS,
 M. C. DUFFICY.